United States Patent Office.

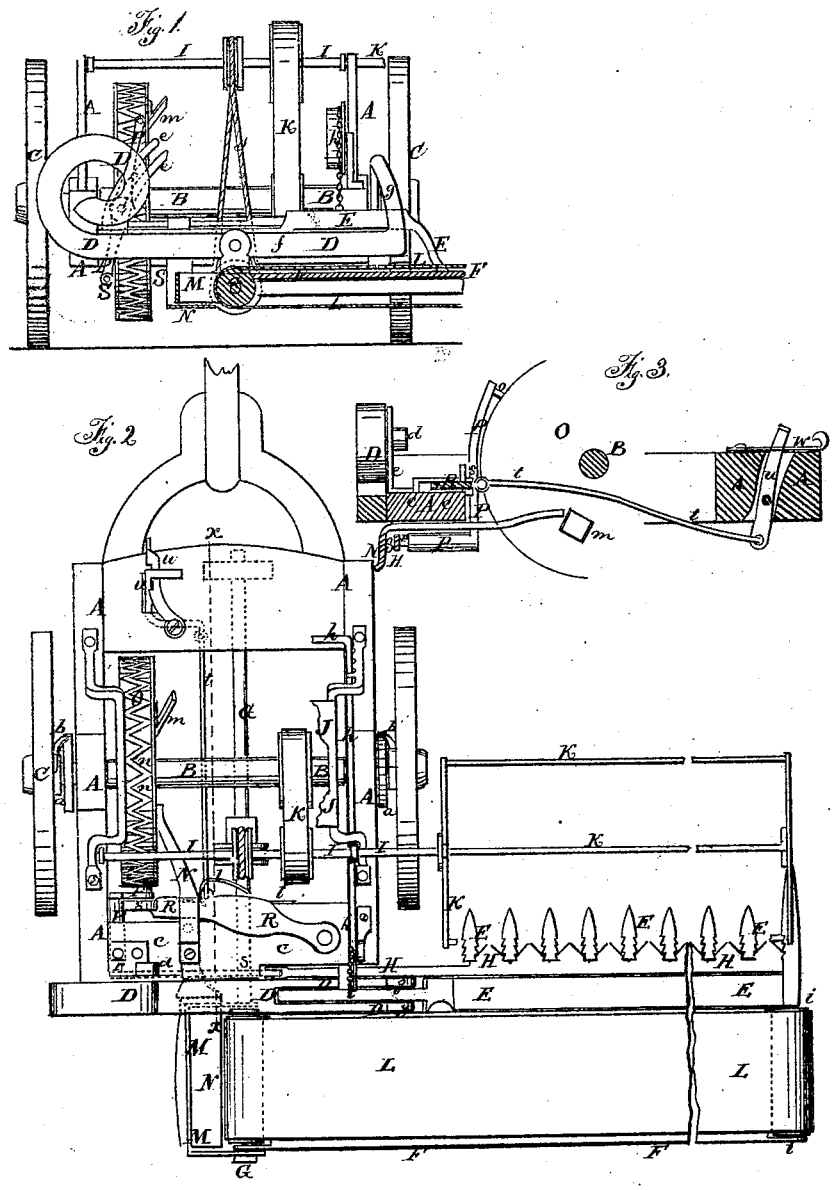

A. W. TUCKER, OF WAXAHACHIE, TEXAS.

Letters Patent No. 70,918, dated November 12, 1867.

IMPROVEMENT IN HARVESTERS.

*The Schedule referred to in these Letters Patent and making part of the same.*

TO ALL WHOM IT MAY CONCERN:

Be it known that I, A. W. TUCKER, of Waxahachie, in the county of Ellis, and State of Texas, have invented a new and improved Mower and Reaper; and I do hereby declare that the following is a full, clear, and exact description of the same, which will enable others skilled in the art to make and use my invention, reference being had to the accompanying drawings, which form part of this specification, in which—

Figure 1 represents a rear elevation, partly in section, of my improved mower and reaper.

Figure 2 is a plan or top view of the same.

Figure 3 is a vertical sectional view of the same, the plane of the section being indicated by the line $xx$, fig. 2.

Similar letters of reference indicate corresponding parts.

This invention relates to an improved reaping and mowing machine, and it consists in suspending the finger-bar and its appendages from a curved beam pivoted to the rear of the frame of the machine, and adjusted in any desired position, so as to set the finger-bar at any desired height, in combination with the pivoted extension of said finger-bar and the chain and lever, all being constructed and arranged to operate as will be hereinafter more fully described.

A represents the frame of the mowing and reaping machine, made of wood or other suitable material, of rectangular or other suitable form, and of sufficient strength to sustain the weight of the working mechanism hereinafter described. B is the main axle of the machine, having its bearing in the frame A. At the end of the axle are hung driving-wheels C C, which are connected with the axle by means of ratchet-wheels $a$ and pawls $b$ in the ordinary manner, so as to make the axle revolve with the wheels when the machine is moved forward, but to disengage the axle from the wheels when the machine is moved backward. D is a beam, made of wood, or of other suitable material, pivoted at or near its centre to the rear cross-beam $c$ of the frame A, and clamped at or near one end by a set-screw or screw and nut, $d$, to a slotted plate, $e$, projecting from the frame A, as is clearly shown in fig. 1. It will be understood that, by means of the screw $d$ and slotted plate $e$, the beam D can be fastened in a horizontal position, or at any suitable incline. E' is the finger-bar, pivoted by a pin, $f$, to the beam D, as shown in fig. 1, so that the arm which is pivoted to the beam rests upon the same when the bar is lowered, and two guide-lugs, $g\,g$, project from the beam to guide the finger-bar when it is raised by means of a chain and lever, $h$, indicated in fig. 1. F is the platform in rear of the finger-bar, secured at its outer end to a small shaft, $i$, projecting from the finger-bar, and resting at its inner end upon a horizontal shaft, G, which is arranged in the lower part of the frame A, and at right angles with the axle B of the same. H is the cutter-bar.

From the above, it will be understood that the weight of the finger-bar, cutter-bar, and part of the platform F, is sustained by the beam D, and that, by changing the position of the beam, the height of the cutting apparatus above the ground can be varied at pleasure. By means of the chain and lever $h$, the finger-bar and its appendages can be raised instantly, independent of the beam D. The shaft G receives its motion by means of a cross-belt, $j$, from a horizontal shaft, I, arranged in the upper part of the frame A, parallel with the axle. The shaft I receives its motion from the axle B by means of a belt, $k$. The shaft I may, if desired, be prolonged to extend as far as the end of the finger-bar, and a reel, K, may be mounted on it as shown. But, if desired, such reel may be arranged on an independent shaft.

The sides of the fingers of the finger-bar E are notched, corrugated, or roughened, as shown in fig. 2, and as described in my application for patent in front-draught reaper filed with this.

J is the driver's seat, arranged above the axle B. On the rear end of the shaft G is mounted, and on the little shaft $i$ is hung, a roller, over which an endless apron, L, is laid, said apron being driven by the motion of the shaft G. The apron receives all the straw or grass cut by the cutter-bar, and carries it in the direction of the arrow, fig. 1, towards the shaft G. If nothing is provided at that end of the apron to receive the straw or grass, the same will be discharged on the ground in continuous succession; but if it is desired to deposit it in swaths, a receptacle, M, is provided to receive the straw or grass from the apron. The bottom of this receptacle is the end of a lever, N, which is, at or near its centre, pivoted to the rear cross-bar of the frame A, and which, at the outer end, is pressed by a spring, $l$, against the face of a disk, O, which is mounted upon the axle B, as shown in fig. 1. A cam, $m$, is formed on the face of the disk O, and forces once during each revolution of the driving-wheels, the lever N off the face of the disk, thereby drawing its other end away from under the box M, and thus the straw or grass accumulated in the box M will be discharged once during every revolution of the wheels. By arranging a larger number of cams, m, it may be more frequently discharged. The cam may be formed on another shaft, or in another form, and I do not claim its peculiar arrangement and construction.

In the edge of the disk O is arranged a zigzag groove, n, as is clearly shown in fig. 1 and 2. Into the same fits a pin, o, which is formed at the end of an upright or nearly upright lever, P, the said lever being, at or near its centre, pivoted to a bar, R, arranged upon the rear cross-piece c of the frame A. The lower end of the lever P is provided with a tubular extension, p, projecting towards the rear, as shown in fig. 3. Into this tube p fits a small pin, r, which is formed on a bar, S, which is hinged to the end of the cutter-bar H.

As the disk O is revolved, the lever P will oscillate around the pin s, by which it is pivoted to the bar R, and thereby the cutter-bar H is moved back and forth. The link in the cutter-bar is necessary to make it work easy. The tube p may also be formed on the bar S, and the pin r on the lever P, if desired. The bar R, which holds the lever P, is pivoted at one end to the surface of the cross-bar c, and is connected by a rod, t, with a lever, u, pivoted to the front part of the frame, so as to be within reach of the driver. By this arrangement the pin o can be thrown out of the groove n, whereby the motion of the cutter-bar will be stopped whenever desired, and can as quickly be thrown into gear again. By a latch, w, the lever u can be locked in any desired position. The beam D may be weighted on one end, to balance the weight of the finger-bar and its appendages.

Having thus described my invention, I claim as new, and desire to secure by Letters Patent—

Suspending the finger-bar and its appendages from a curved beam, D, pivoted to the rear of the frame of the machine, and adjustable in any desired position, as set forth, so as to set the finger-bar at any desired height, in combination with the pivoted extension E' of the finger-bar, and the chain and lever h, all being constructed, arranged, and operated in the manner and for the purpose set forth.

A. W. TUCKER.

Witnesses:
    WM. F. McNAMARA,
    ALEX. F. ROBERTS.